United States Patent [19]

Saito

[11] Patent Number: 5,149,007
[45] Date of Patent: Sep. 22, 1992

[54] DRAG MECHANISM FOR SPINNING REEL FOR FISHING

[75] Inventor: Masaji Saito, Tokyo, Japan

[73] Assignee: Daiwa Seiko, Tokyo, Japan

[21] Appl. No.: 562,595

[22] Filed: Aug. 3, 1990

[30] Foreign Application Priority Data

Aug. 10, 1989 [JP] Japan .................. 1-93448[U]

[51] Int. Cl.⁵ .................................. A01K 89/027
[52] U.S. Cl. ................................................ 242/246
[58] Field of Search ............... 242/245, 246, 319, 290

[56] References Cited

U.S. PATENT DOCUMENTS

| 4,513,925 | 4/1985 | Yamaguchi | 242/245 |
| 4,702,432 | 10/1987 | Kaneko et al. | 242/246 |
| 4,728,053 | 3/1988 | Hitomi | 242/246 |

FOREIGN PATENT DOCUMENTS 57-58947 12/1982 Japan.

Primary Examiner—Katherine Matecki
Attorney, Agent, or Firm—Longacre & White

[57] ABSTRACT

A drag mechanism for a spinning reel for fishing, in which a pressure member is provided to push brake plates provided in a spool and is fitted on a spool shaft so that the member can be moved in the axial direction of the shaft; a drag control knob is screw-engaged with the shaft; the front of the pressure member is fitted on the knob so that the knob can be turned relative to the member and the space between the knob and the member is nearly sealed; and an annular spring is fitted to one of the member and the knob in the space so that the bent projecting portion of the spring is engaged with the engaged undulated part of the inside circumferential surface of the other of the member and the knob in the space. According to the above construction, the drag mechanism, especially the drag control knob can be improved in a water-proof property and reduced in size.

6 Claims, 3 Drawing Sheets

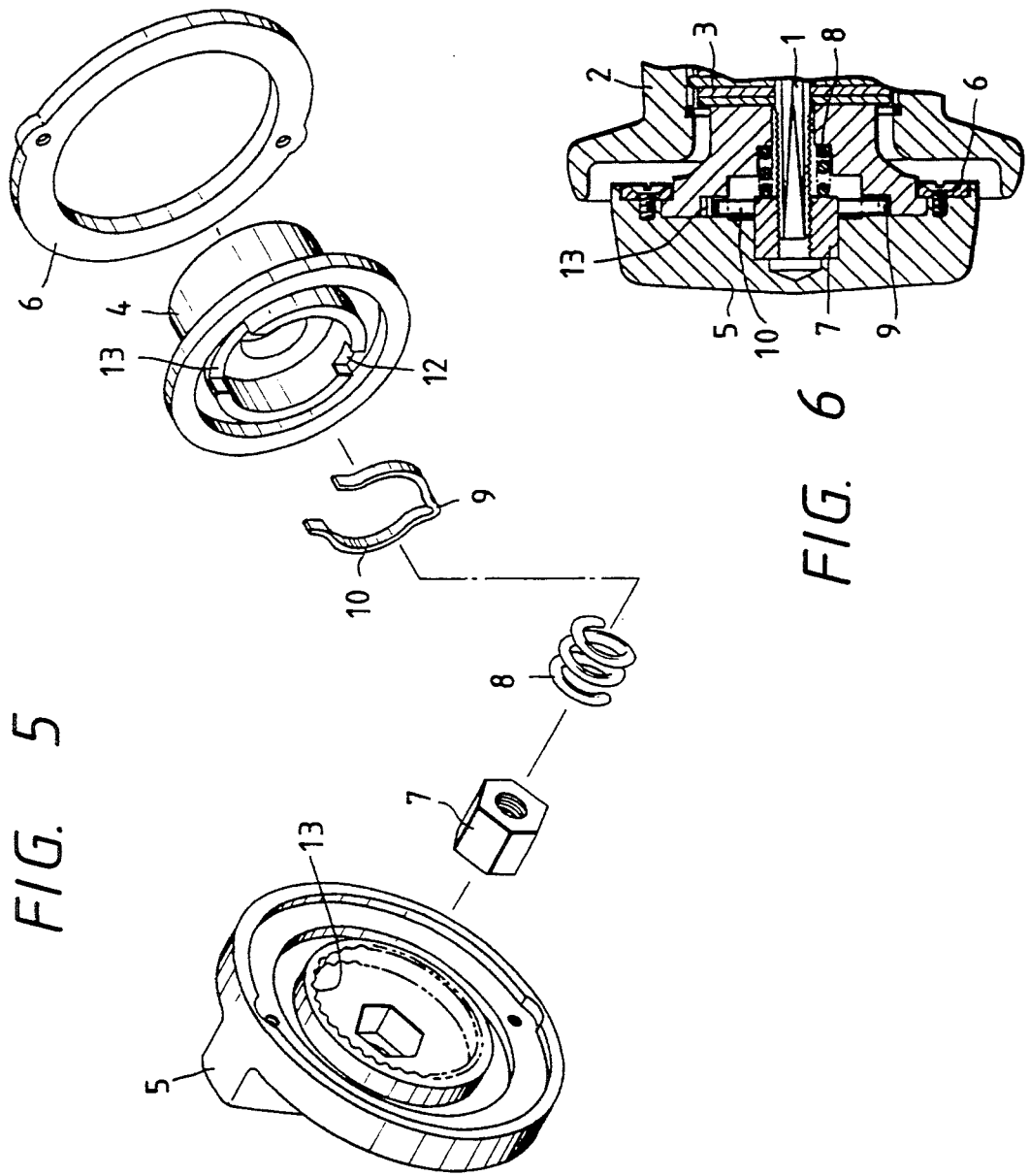

DRAG MECHANISM FOR SPINNING REEL FOR FISHING

BACKGROUND OF THE INVENTION

The present invention relates to an improved drag mechanism for a spinning reel for fishing.

It was disclosed in the Japanese Utility Model Application Examined Publication No. 57-58947 that a pressure member for pushing brake plates and a drag control knob are formed separately from each other in a drag mechanism of the front drag control type for a spinning reel. In order to prevent the drag control knob from turning spontaneously, engaging teeth are provided on the outside of the pressure member and an engaging claw is engaged with one of the teeth. However, since sea water, sand, garbage or the like is likely to cling to the engaging teeth and the engaging claw, the function of preventing the knob from turning spontaneously cannot be surely maintained. This is a problem. Since the engaging teeth and the engaging claw are provided, the diameter of the knob is increased so that the drag mechanism cannot be provided for the compact spool of a spinning reel. This is also a problem.

SUMMARY OF THE INVENTION

The present invention was made in order to solve the above-mentioned problem.

Accordingly, it is an object of the present invention to provide a drag mechanism which is for a spinning reel for fishing and in which means for preventing a drag control knob from turning spontaneously is made compact and extraneous substance such as sea water, sand and garbage is kept from clinging to the means.

In the drag mechanism, a pressure member is provided to push the brake plates provided in a spool and is fitted on a spool shaft so that the pressure member can be moved in the axial direction of the spool shaft. The drag control knob is screw-engaged or threadly engaged with the spool shaft. The front of the pressure member is fitted on the knob so that the knob can be turned relative to the pressure member and the space between the member and the knob is nearly sealed. An annular spring is fitted to one of the pressure member and the drag control knob in the nearly sealed space so that the bent projecting portion of the spring is engaged with the engaging undulated part of the inside circumferential surface of the other of the member and the knob in the space. If the annular spring is fitted to the pressure member, the inside circumferential surface of the drag control knob is formed with the engaging undulated part with which the bent projection portion of the spring is engaged. If the spring is fitted to the knob, the inside circumferential surface of the pressure member is formed with the engaging undulated part with which the bent projecting portion of the spring is engaged.

The control knob is turned while the engaging undulated part of the inside circumferential surface of the knob or the pressure member and the bent projecting portion of the annular spring are resiliently slipped on each other, so that the pressure member is pushed to regulate the pressure of the brake plates on the spool. The braking force of the drag mechanism on the spool is thus adjusted. After that, the engagement of the bent projecting portion of the spring with the engaging undulated part prevents the knob from turning spontaneously.

Since the means for preventing the drag control knob from turning spontaneously is composed of the annular spring and the engaging undulated part engaged therewith and is housed in the nearly sealed space between the knob and the pressure member for pushing the brake plates, the extraneous substance is prevented from entering into the space and clinging to the means in fishing. The preventive function of the means is thus always surely maintained. Since the knob is made compact, the drag mechanism can be applied to a compact spool as well.

BRIEF DESCRIPTION OF THE DRAWINGS

In the accompanying drawings:

FIG. 5 is an exploded view of a major part of the drag mechanism; and

FIG. 6 is a longitudinally-sectional view of a major part of a drag mechanism which is another embodiment of the present invention.

DETAILED DESCRIPTION OF THE PREFERRED EMBODIMENTS

Embodiments of the present invention are hereinafter described in detail with reference to the drawings attached hereto.

Figure 1:
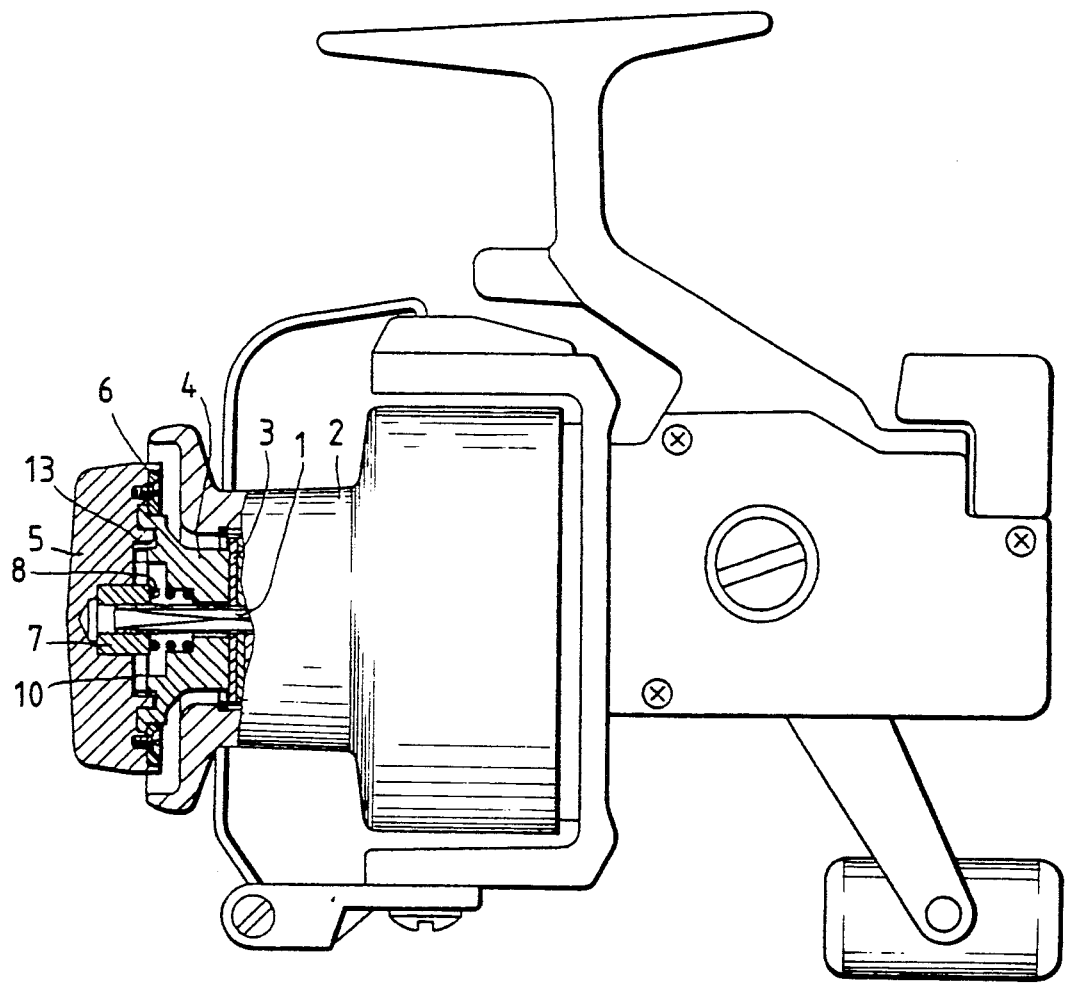
FIG. 1 is a longitudinally-sectional partial view of a drag mechanism which is an embodiment of the present invention.
Figure 2:
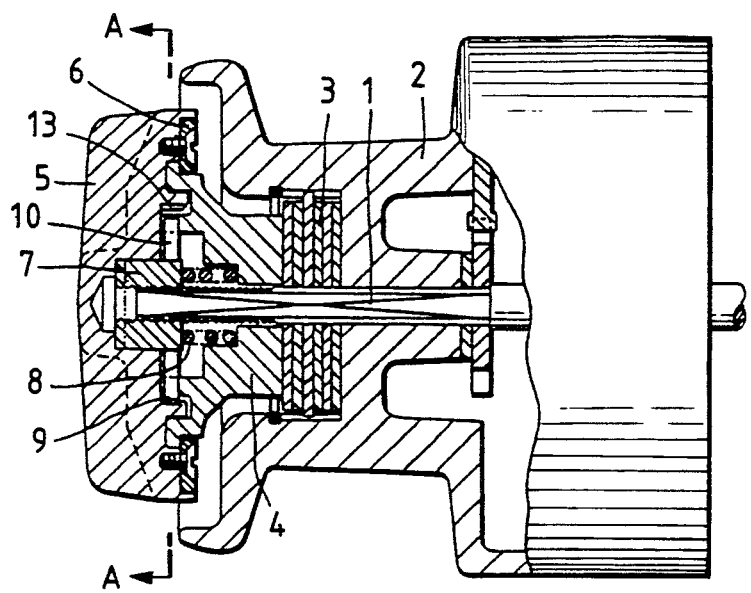
FIG. 2 is an enlarged longitudinally-sectional view of the drag mechanism.
Figure 3:
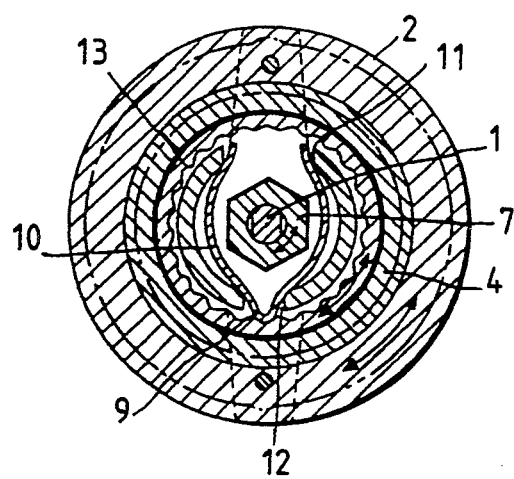
FIG. 3 is a cross-sectional view of the drag mechanism along a line A—A shown in FIG. 2.
Figure 4:
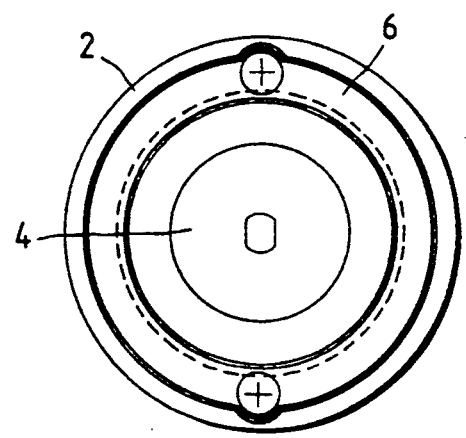
FIG. 4 is a rear view of a major part of the drag mechanism.

FIGS. 1, 2, 3, 4, and 5 show a drag mechanism which is one of the embodiments and is for a spinning reel. The drag mechanism includes brake plates 3, a pressure member 4, a drag control knob 5, an annular fitting plate 6, a nut 7, a helical spring 8, and an annular spring 10. The brake plates 3 are fitted in a conventional manner in the front recess of the spool 2 of the reel in which the spool is rotatably fitted on a spool shaft 1 whose cross section is shaped as a notched circle. The pressure member 4 is provided in contact with the foremost one of the brake plates 3 and fitted on the spool shaft 1 so that the pressure member can be slid only in the axial direction of the shaft. The peripheral portion of the front of the pressure member 4 is fitted on the drag control knob 5 by the annular fitted plate 6 so that the knob can be turned relative to the pressure member, and the space between the knob and the member is nearly sealed. The nut 7 is screw-engaged with the front end portion of the spool shaft 1 and fitted in the drag control knob 5 so that the nut can be moved in the axial direction thereof but cannot be turned relative to the knob. The helical spring 8 is spirally fitted on the spool shaft 1 between the rear end of the nut 7 and the pressure member 4. The annular spring 10 has a bent projection portion 9 and is fitted to the notched parts 11 and 12 of the front portion of the pressure member 4 in the nearly sealed or closed space between the member and the knob 5 so that the bent projection portion is engaged with the engaging undulated part 13 of the inside circumferential surface of the rear portion of the knob.

FIG. 6 shows a major part of a drag mechanism which is another of the embodiments and is for a spinning reel. The difference of the drag mechanism from that shown in FIGS. 1, 2, 3, 4 and 5 is that an annular spring 10 is fitted to a drag control knob 5 so that the bent projection portion 9 of the spring is engaged with the engaging undulated part 13 of the inside circumferential surface of a pressure member 4.

In each of the embodiments, the drag control knob 5 is turned while the bent projection portion 9 of the spring 10 and the engaging undulated part 13 are resiliently slipped on each other, so that the nut 7 is moved backward or forward to regulate the pressure member 4 on the brake plates 3 through the action of the helical spring 8. The pressure of the brake plates 3 on the spool is thus controlled so that the braking force of the drag mechanism on the spool is adjusted.

Since the annular spring 10 and the engaging undulated part 13, which act to prevent the drag control knob 5 from turning spontaneously, are housed in the nearly sealed space between the knob and the pressure member 4 in each of the embodiments, an extraneous substance such as sea water, sand and garbage is kept from entering into the space and clinging to the annular spring and the engaging undulated part and the outside diameter of the knob is not increased.

What is claimed is:

1. A drag mechanism for a spinning reel for fishing, comprising:
   a reel body;
   a spool shaft connected to and extending from said reel body along a longitudinal axis of said spool shaft;
   a spool for receiving fishing line there around rotatably mounted on said spool shaft;
   braking means comprising brake plates mounted on said spool shaft for braking the rotation of said spool with respect to said spool shaft;
   depressing means non-rotatably mounted on said spool shaft for urging said brake plates along said spool shaft and against said spool, said depressing means comprising a pressure member for contacting said brake plates;
   braking force adjusting means for controlling the braking of said brake plates against said spool, said adjusting means comprising a control knob which is threadingly engaged with an end of said spool shaft and rotatable relative to said pressure member, said control knob and said pressure member having mutually facing surfaces which contact each other, said mutually facing surfaces defining a substantially enclosed chamber along said spool shaft between said pressure member and said control knob; and,
   engagement means located within said substantially enclosed chamber for preventing free rotation between said control knob and said pressure member.

2. A drag mechanism as in claim 1, wherein:
   said engagement means comprises an undulating inner circumferential rim on said control knob located within said chamber, and a spring member mounted on said pressure member, said spring member including a projection for engaging said undulating rim and preventing free rotation between said pressure member and said control knob.

3. A drag mechanism as in claim 1, wherein:
   said engagement means comprises an undulating inner circumferential rim on said pressure member located within said chamber, and a spring member mounted on said control knob, said spring member including a projection for engaging said undulating rim and preventing free rotation between said pressure member and said control knob.

4. A drag mechanism as in claim 1, further comprising:
   biasing means for urging said pressure member and said control knob axially apart along said spool shaft.

5. A drag mechanism as in claim 4, wherein:
   said biasing means comprises a helical spring fitter along said spool shaft in said chamber.

6. A drag mechanism for a spinning reel for fishing, comprising:
   a reel body;
   a spool shaft connected to and extending from said reel body along a longitudinal axis of said spool shaft;
   a spool for receiving fishing line there around rotatably mounted on said spool shaft;
   braking means comprising brake plates mounted on said spool shaft for braking the rotation of said spool with respect to said spool shaft;
   depressing means non-rotatably mounted on said spool shaft for urging said brake plates along said spool shaft and against said spool, said depressing means comprising a pressure member for contacting said brake plates;
   braking force adjusting means for controlling the braking of said brake plates against said spool, said adjusting means comprising a control knob threadingly engaged with an end of said spool shaft and rotatably related to said pressure member along said spool shaft, said control knob being in contact with said pressure member to form a substantially enclosed chamber along said spool shaft between said pressure member and said control knob; and,
   engagement means located within said chamber between said pressure member and said control knob for preventing free rotation between said control knob and said pressure member;
   said pressure member further comprises a flange element on a side thereof facing said control knob, said flange element being mounted for rotation against a surface of said control knob facing said pressure member, and being held in position against said control knob surface by an annular fitting plate which is attached to said control knob.

* * * * *